Dec. 8, 1964    M. W. ROSEN    3,160,026
GEAR TRANSMISSION

Filed July 6, 1961    3 Sheets-Sheet 1

INVENTOR.
MOE WILLIAM ROSEN
BY

*V.C. Muller*
ATTORNEY.

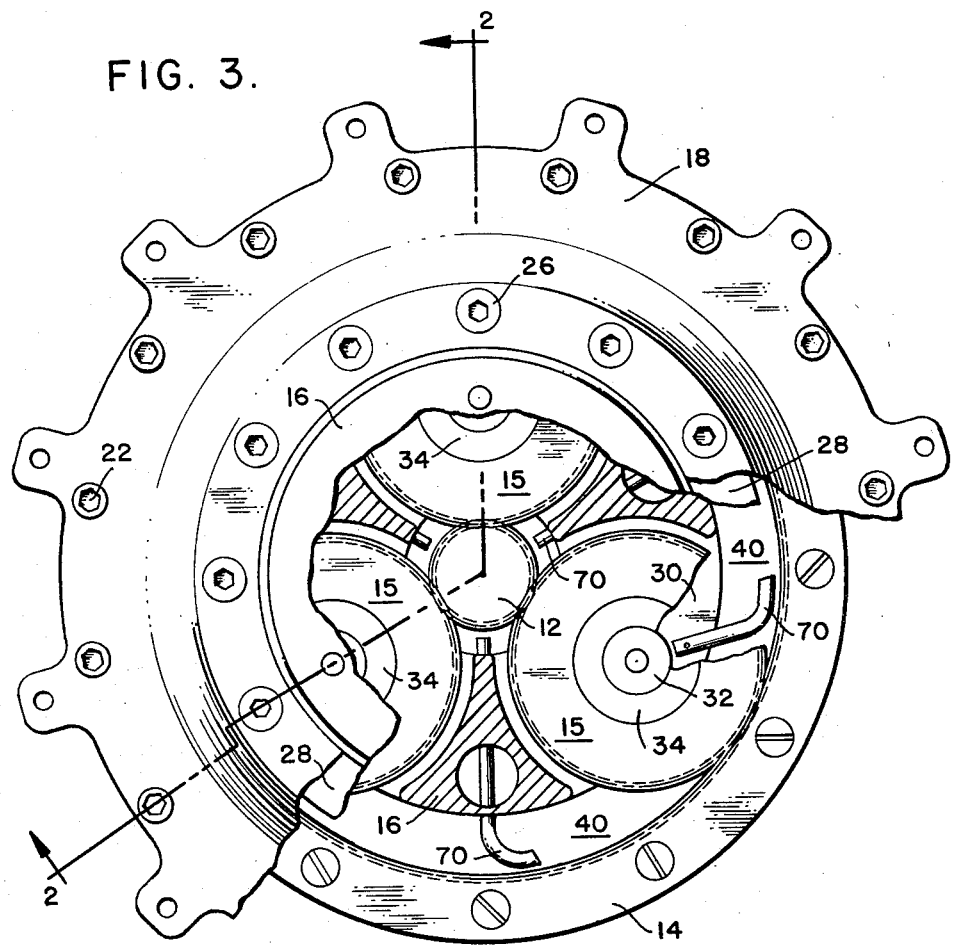

INVENTOR.
MOE WILLIAM ROSEN
ATTORNEY.

United States Patent Office 3,160,026
Patented Dec. 8, 1964

3,160,026
GEAR TRANSMISSION
Moe William Rosen, 3440 Loma View Drive,
Altadena, Calif.
Filed July 6, 1961, Ser. No. 124,300
2 Claims. (Cl. 74—410)
(Granted under Title 35, U.S. Code (1952), sec. 266)

The invention described herein may be manufactured and used by or for the United States of America for governmental purposes without the payment of any royalties thereon or therefor.

This invention relates to power transmission gearing and more particularly to improvements contributing to the reduction of noise.

While noise generated by gear transmissions is generally objectionable there are certain uses in which undue noise is so critical that it may adversely affect an entire system. Thus, in a torpedo, its audible noise may be sufficient to enable the crew of a submarine target to hear its approach and take evasive action. Sonar detection devices carried by the submarine may also detect very low intensity noises within audible frequencies as well as the inaudible frequencies, and permit like evasive action. The torpedo weapon, if of the homing type, is also adversely affected by self-noise in that its sonar is usually less sensitive to detect the target with increases in self-noise intensity. Until the completely silent torpedo has been devised it thus becomes apparent that one manner of improving its effectiveness is by reduction of self-noise. Noise generated by reduction gearing in submarine propulsion machinery is likewise objectionable since it enables a passive enemy homing torpedo to more readily detect its target. The problem is further complicated in that noise intensity, alone, is not the sole criterion of detection, its frequency level also being important. The noise, moreover, is seldom of a single frequency, it usually being sound of various fundamental frequencies and their overtones.

One of the objects of the invention is to provide a gear transmission which generates significantly less sound energy than transmissions heretofore proposed and which is of particular utility in torpedoes, submarines and ships.

Other objects, advantages and salient features will become more apparent from the description to follow, the appended claims, and the accompanying drawing, in which:

FIG. 3 is an end elevation, in the direction of arrow 3, FIG. 2, portions being broken away;

Figure 6:
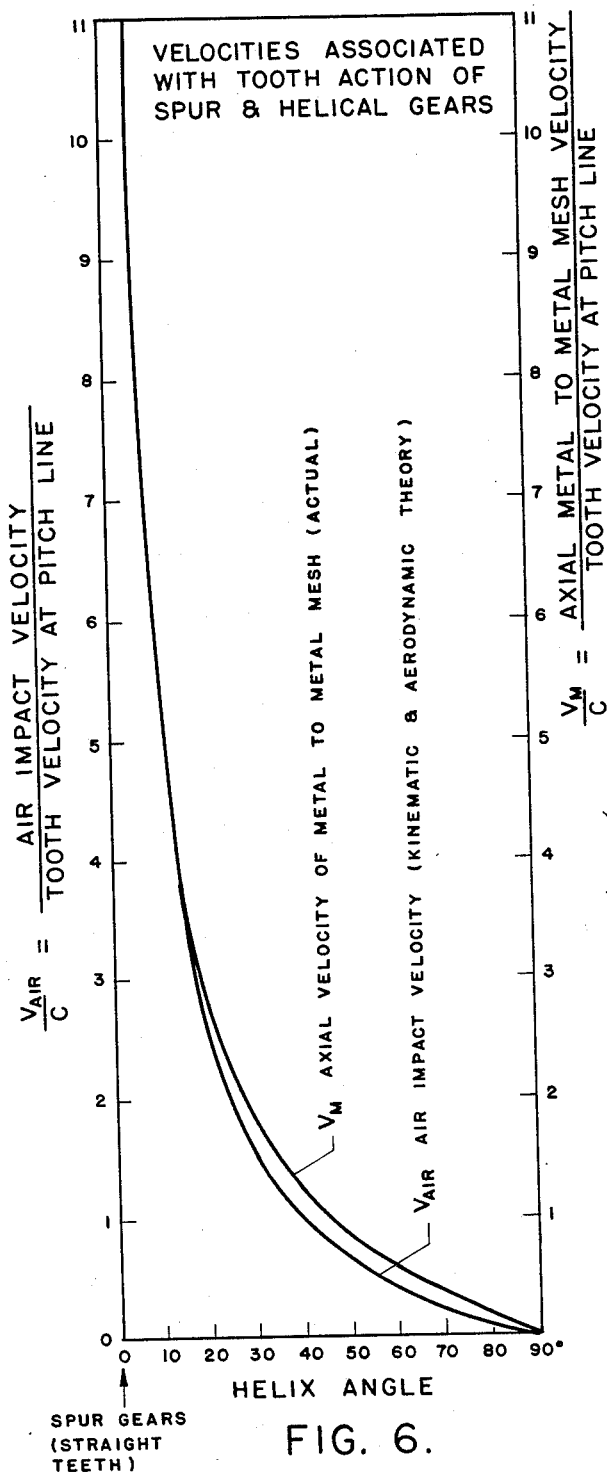
Figure 5:
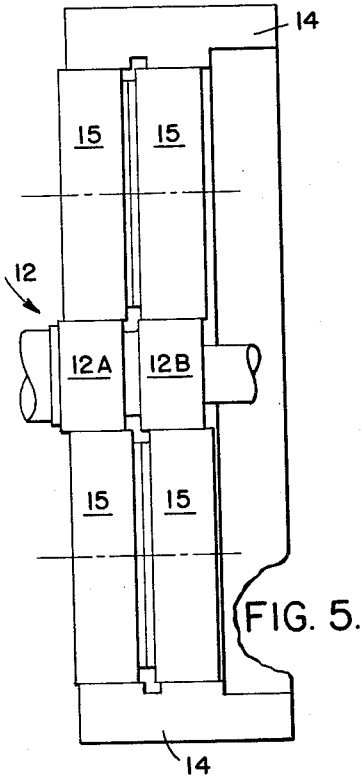
Figure 4:
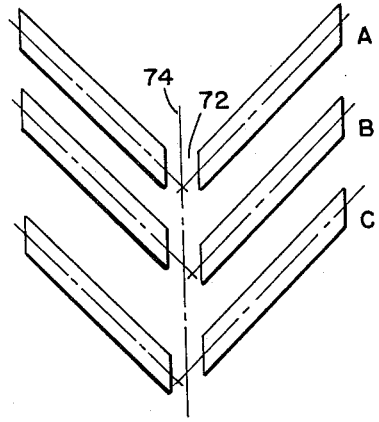

FIG. 4 diagrammatically illustrates certain tolerances of angular mis-alignment of a two part herringbone gear;

FIG. 5 diagrammatically illustrates the axial mis-alignments of meshing herringbone gears, and FIG. 6 graphically illustrates phenomena which varies with helix angle.

The concept of the present invention stems from the belief that a relationship exists between the tooth helix angle of a helical gear and the noise which its teeth will generate. While helical gears have long been known to operate more silently than a similar straight cut or spur gear, the relationship between helix angle and generated noise does not appear to have been investigated beyond the empirical results of experiment. To extend such investigation, certain relationships were plotted in theoretical curves on the assumption that noise bears a relationship to (1) tooth impact velocity and (2) velocity of air moving into and out of the variable volume spaces formed at the tooth mesh. Such curves, FIG. 6, show that (1) as the helix angle is increased from 0° (spur gear) the ratio between axial mesh velocity to tooth velocity at the pitch line decreases from infinity to 0. The air impact velocity decreases in the same manner and the curves fall quite close together indicating that increase of helix angle could be beneficial to reduction of noise produced by both metal mesh and air impact.

While the curves indicated the desirability of as high a helix angle as possible it was recognized that end thrust increases with increase in helix angle, becoming infinite at the theoretical optimum (but impractical) helix angle of 90°. The solution to such problem would appear to be to employ the well known expedient of right and left hand helical gears which would balance or neutralize end thrust, such gears when placed adjacent each other being commonly known as herringbone gears.

It is well known that accuracy of gear tooth shape, tooth spacing, concentricity of the teeth, and accuracy of the helix angle are all important factors which must be considered in the design of qiuet gears. Machine cutting techniques are available for obtaining desired tolerances in these factors in soft machinable metal. Soft gears, however, cannot transmit heavy loads unless the unit tooth loading is held below certain values. If hardened to increase unit loading, the teeth must be machined oversize and ground to finished dimensions after hardening to eliminate the distortions caused by hardening. Herringbone gears cannot be ground, however, if of one piece construction, since the spaces adjacent the intersection of the teeth do not permit grinding wheel clearance. Herringbone gears can conceivably be formed as separate right and left hand helical gears with an annular gap between them and ground separately prior to assembly but such ground tooth construction would be unconventional and even if possible would be limited to low helix angles (less than 20°) since no gear tooth grinding equipment was formerly available for grinding at a helix angle of, say 45°, the angle chosen for verifying the beliefs and theory previously referred to. Many gear manufacturers, without exception, indicated the impossibility of grinding helical teeth with an angle of the order of 45°. Only after design changes were made in the Reichauer type of machine did it become feasible to grind such high helix angles to the requisite accuracy.

Since a highly compact reduction transmission was desired a planetary configuration was chosen to test the beliefs and theories refered to. With reference to the drawing, the principal components are a stationary casing 10 which provides the support for all parts, a power input pinion 12, a power output internal or ring gear 14 journaled in the casing and three idler gears 15 journaled by a planetary cage 16 which is rigidly secured to a casing cover 18. All gears may thus be considered as journaled for rotation by a single support formed of several parts for expediency of assembly.

The pinions and idlers are of nickel steel, hobbed to .005–010" of finished shape, carburized, heat treated and hardened to about 60 to 65 Rockwell C and ground to size with the Reichauer machine previously referred to, modified to grind a 45° helix angle. The ring gear is of 4130 steel with teeth shaped by the planing process and thence polished, but not ground, since there is no known method at present for grinding such teeth. An unground ring gear can be tolerated with little sacrifice to optimum desired results, however, since hardened teeth are not as critical as the pinion-idler meshes due to the materially increased tooth contact area with the ring gear, and hence lowered unit tooth pressures. This will become apparent from geometry when it is considered that the pinion is of small diameter and hence relatively highly convex, meshing with a convex idler, whereas an idler is less convex than the pinion and meshes with a concave ring gear. Since the ring gear teeth cannot be ground they should not be carburized and hardened since warpage or other distortion cannot be tolerated.

The conventional 14½° pressure angle with involute profile for the teeth was chosen, principally to simplify machining operations and to enable use of conventional machining methods as much as practicable. Pressure angle and tooth profile are considered of minor criticality, however, as compared to the helix angle which will be subsequently discussed in further detail. Other gear and tooth dimensions are: Helix angle —45°; normal diametrical pitch —32; actual diametrical pitch —22.6; width (each gear half) —⅝" (approx.); pinion —19 teeth; idlers —44 teeth; ring gear 107 teeth; ratio—5.6 to 1. Performance requirement is that the transmission continuously transmits at least 75 H.P. at 14,000 r.p.m. of the pinion. All parts are shown full size in the drawing, the weight of the unit being about 17 pounds.

Casing 10, previously referred to, comprises a suitable metal casting to which is secured metal cover 18 by screws 22, at a machined circular joint 24 which accurately axially aligns the two parts. To cover 18 is affixed, by angularly spaced screws 26, a planet cage 16, also previously referred to, which is an integral metallic member forming spaced supports 28, 30 for the ends of each planet gear support shaft or pintle 32. Anti-friction rollers 34 engage the pintle and bore of an idler gear. The pinion is journaled on ball bearings 36, 38, the outer races of which are supported at spaced points in the central bore of the planet cage and are free to float axially. The ring gear is carried by a disk 40, formed as an integral part of shaft 42, supported by ball bearings 44, 46, and locked against axial movement by shoulder 48 and snap ring 50. The outer periphery of disk 40 is provided with splines 52 which engages mating splines 54 integrally formed in gear half 14A of ring gear 14. A snap wire 56 engages mating circumferential grooves in the disk and ring gear half to prevent axial movement between these two parts. The engagement between the splines is snug but should permit approximately .002 inch radial movement of the ring gear.

Pinion 12 is formed of right and left hand helical gears, gear 12A being formed integral with pinion shaft 58 and gear 12B being secured to it by a spline or key 60 and nut 62, there being no relative angular movement between the two helical gears of the herringbone pinion. Each idler, which may also float axially, is formed of a pair of helical gears secured together by angular spaced screws 64 and dowel pins 66, and accurately aligned axially by a mating step joint 68. The same securing construction is employed for the two helical gears of the herringbone ring gear.

A plurality of oil feed tubes 70 are supported by various portions of the planet cage, their outer ends being bent tangentially to receive oil rammed into them by ring gear rotation and their inner ends terminating at the bearings or gears to be lubricated. The casing is partially filled with oil which is thus force fed to all rapidly moving parts requiring large circulation.

To minimize noise, it is essential that the unit loading of the teeth at all like points of mesh be as nearly the same as practicable. Thus, each mesh between the pinion and the idlers should transmit one third of the load and each half of a gear should transmit one half of the one third or one sixth of the load. If all meshes were such that no relative axial movement between meshing teeth were possible then the tooth shapes and dimensions must be exact. Small tolerances, or departures from the exact, must be expected, however, in most manufacturing techniques and hence if the loading referred to is to be attained it must be attained on the assumption that the gears depart from theoretical exactness, within certain limitations or tolerance. Since each of the herringbone gears is formed of two assembled helical gears it will be apparent that an angular tolerance of assembly must be expected. FIG. 4A illustrates any pair of helical gears having a gap 72 between the teeth. If assembled in exact angular alignment the projection of helical lines passing through the geometric centers of adjacent teeth will intersect in the plane 74 at the exact center of the gap. If there is angular displacement from the theoretical ideal just referred to they will intersect at one side or the other as illustrated in FIGS. 4B and 4C, depending upon the relative direction of the angular displacement. As will subsequently appear, all gears may have angular tolerances as illustrated in FIGS. 4B and 4C in any combination. FIG. 5 illustrates, to a highly exaggerated scale, the relative positions of the herringbone gears which have various angular tolerances of assembly between each pair of helical gears. It is to be observed that so long as relative axial movement is permitted between any pair of meshing gears so that they may "float" axially, each helical gear will automatically assume one half of the load of the herringbone gear of which it forms a part irrespective of rotational error of assembly of the adjacent gears. As illustrated, this shifts the central plane of the gap of each gear laterally from the like central plane of its mating gear, thus staggering these planes. Excessive staggering is undesirable since it reduces the effective width of mesh of the teeth, thus increasing their loading and producing unequal wear along their length. It is thus contemplated that substantially full width of mesh be attained, to the extent that the exaggerated staggering would be undetectable except by precision measurements. The slight staggering which is permissible, however, is what permits each gear half to assume its one half of the load rather than imposing the entire load on the other gear half.

To determine noise characteristics of the transmission a special high speed acoustic drive facility has been devised which consists essentially of a turbine prime mover and a dynamometer connected respectively to the power input and output shafts of the transmission and acoustically isolated from it so that only the transmission noise could be investigated. A microphone is employed at a plurality of points (up to 37) on a hemisphere to pick up noise energy and provide necessary data for integrating total noise energy.

A transmission, substantially the same as the one forming the subject of this invention, except that the gears are of spur type (0° helix angle) was also tested for comparative purposes. The results of these two tests are tabulated as follows:

| | 10,000 r.p.m., 10 h.p. | 10,000 r.p.m., 30 h.p. | 15,000 r.p.m., 30 h.p. | 20,000 r.p.m., 40 h.p. |
|---|---|---|---|---|
| Spur Gear Planetary Transmission, .0002" Accuracy | 103½ db av.<br>107 db high | 107 db av.<br>109 db high | 107 db av.<br>109 db high | 105 db av.<br>108 db high. |
| Herringbone Transmission, .0002" Accuracy | 79 db av.<br>82 db high | 80 db av.<br>83 db high | 84 db av.<br>87 db high | 88 db av.<br>94 db high. |

The db numbers are total sound level pressure over the 0 to 35 kc. range as referred to .0002 dynes/cm.$^2$.

As will be apparent, the transmission noises of the transmission of this invention are in general 23 to 27 db lower than the spur gear transmission. Since a 3 db rise in a noise level is approximately equal to a doubling of acoustic energy the transmission of this invention radiated only 1/200 to 1/500 of the acoustic energy of the spur gear transmission. Since both transmissions were constructed to the same tolerances the noise reduction achieved by this invention can be attributed to the high helix angle, uniform loading, and identical meshing action of all of the herringbone gears.

Certain previously unknown phenomena appeared as a result of the above and other extensive tests which is as follows:

(1) The total acoustic energy emanating from a spur gear transmission at constant tooth velocity is directly proportional to the power transmitted.

(2) Transmission noises appear to be correlated with compressibility of air.

(3) Small increases in tooth speed at constant power can effect rapid rises in acoustic energy. Noise increases resulting from speed increases are more rapid than those resulting from power increases.

(4) The principal source of noise is the meshing action of the teeth. Gear wheel disks and casing respond to the gear mesh stimulus. Ball bearing noises are minor.

(5) Frequencies of noises extend with strength into and possibly beyond the 30 kc. region.

(6) Noises show presence in strength of the first through sixth harmonics of tooth mesh frequency.

(7) The second harmonic of the tooth mesh frequency may often be considerably more powerful than the fundamental.

(8) The predominant noises in the high frequency bands are tooth mesh frequency and its second harmonic. In the lower frequency bands the predominant noises are the fundamental and second harmonics of the gear disks and casing components. Even though the tooth mesh frequencies do not correspond to the fundamental frequencies of such components they vigorously respond. Resonance creates sharp rises in noise when speed causes the tooth mesh frequency to approach the natural frequency of gear disks or case components.

In the tests previously referred to the transmission forming the subject of this invention was compared with a transmission constructed to substantially the same tolerances, the principal difference being that one was a spur type and the other a herringbone type with 45° helix angle and, as noted, the noise emanated by the latter was only a small fraction of the noise emanated by the former. It may thus be concluded that the noise reduction was principally a function of helix angle. An increase in the helix angle, alone, however, would not necessarily reduce noise if not associated with other factors. The factors present in the test are summarized as follows:

(a) High helix angle (45°).
(b) Planetary configuration with internal ring gear.
(c) Herringbone arrangement of helical gears.
(d) Accuracy of tooth geometry, including helix divergence angle of .0002" or better.
(e) Carburized tooth surfaces with ductile impact resisting cores.
(f) Axial flotation of gears.
(g) Generatively ground tooth surfaces.
(h) Extreme rigidity of all parts.

Figure 2:
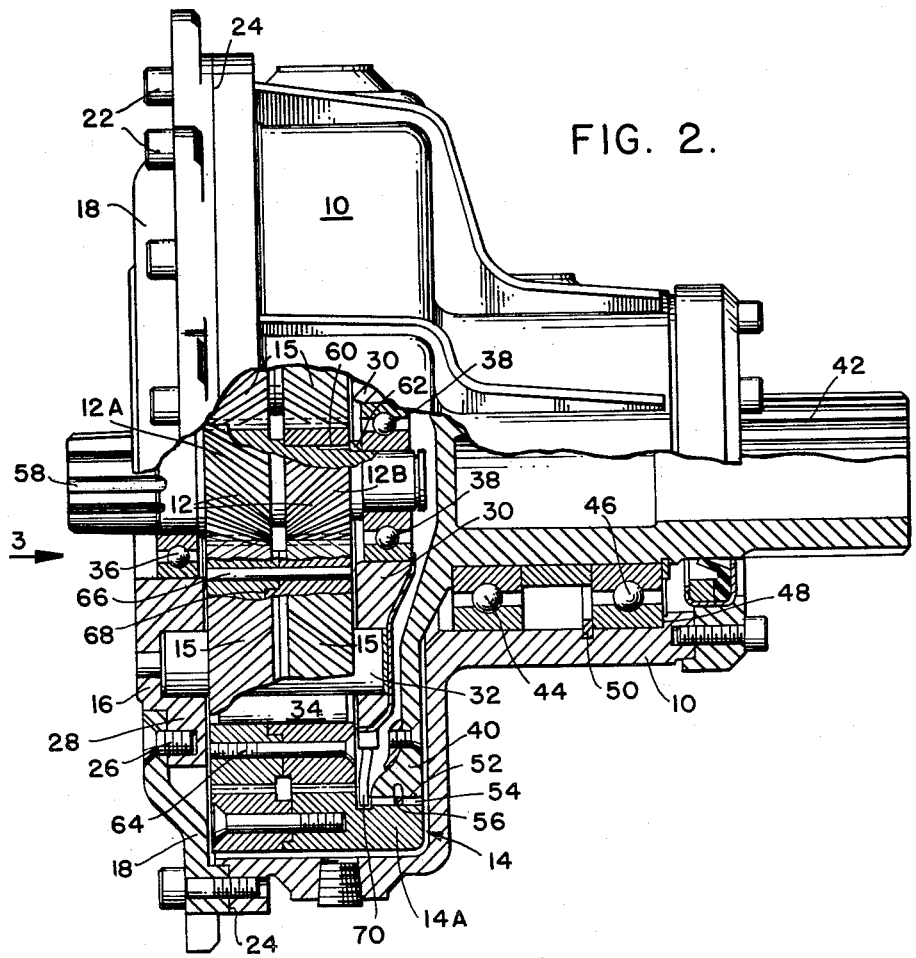
FIG 2 is a partial side elevation and section taken on line 2—2, FIG. 3.
Figure 1:
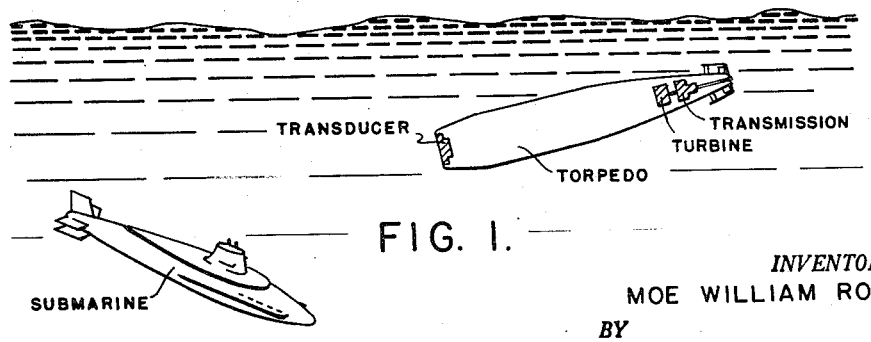
FIG. 1 illustrates environments of particular utility for the invention.

The invention is of utility in any installation where minimization of noise is essential and which would thus warrant increased costs of manufacture. A torpedo is such an installation. FIG. 1 illustrates a torpedo which contains such a transmission for reducing the speed of a turbine to a lower speed for driving a propulsion device such as propellers or a pump jet rotor. The material reduction of self noise in the torpedo renders the transducer of its acoustic homing apparatus far more sensitive and thus permits it to home on targets at greater distances. Since self noise is materially reduced the torpedo is more difficult to detect by sonic apparatus carried by a target, such as a submarine. The transmission may also be employed in a submarine to reduce turbine speed to desirable propeller speed. But rendering the submarine more quiet it becomes a more elusive target for an enemy torpedo.

Obviously many modifications and variations of the present invention are possible in the light of the above teachings. It is therefore to be understood that within the scope of the appended claims the invention may be practiced otherwise than as specifically described.

What is claimed is:

1. In a water borne vehicle of the type having (1) sonic detection apparatus, (2) a high speed rotary prime mover, (3) propulsion apparatus, and (4) a speed reducing gear transmission interposed between the prime mover and propulsion apparatus, said transmission generating self-noise which adversely affects the sensitivity of the sonic detection apparatus, the improvements in the combination aforesaid wherein said transmission is of the type having:

(a) a central herringbone drive pinion,
(b) an internal herringbone driven gear mounted for rotation about the axis of the pinion,
(c) said internal gear having unhardened, generatively shaped, and polished teeth,
(d) a plurality of equi-angularly spaced herringbone idler gears, each meshing with the pinion and internal gear,
(e) the pinion and each idler gear comprising adjacent separate right and left hand helical gear portions, each having teeth of ferrous material which are provided with ductile impact resisting cores and meshing surfaces which are hardened and ground to finished shape prior to assembly thereof, with a helix angle of about 45° or more,
(f) each of said right hand helical gear portions being of the same width as and axially spaced from its adjacent left hand helical gear portion to form an annular gap therebetween, each of said adjacent helical gear portions having the angular alignment of their teeth such that their helices intersect within said gap at one side of its central plane,
(g) said idler gears being free to float in an axial direction, whereby transmitted load is distributed equally between adjacent pairs of meshing helical gears irrespective of their rotational errors of assembly,
(h) said transmission, as compared to a like transmission having 0° tooth helix angle, generating 1/200 to 1/500 of the sound energy of said like transmission,
(i) the reduction in noise, aforesaid rendering said sonic detection apparatus material more sensitive, whereby it may detect a source of sound at materially greater distance than with the use of said like transmission.

2. A herringbone gear transmission comprising:
(a) a central herringbone drive pinion,
(b) an internal herringbone driven gear mounted for rotation about the axis of the pinion,
(c) said internal gear having unhardened, generatively shaped, and polished teeth,
(d) a plurality of equi-angularly spaced herringbone idler gears, each meshing with the pinion and internal gear,
(e) the pinion and each idler gear comprising adjacent separate right and left hand helical gear portions, each having teeth of ferrous material which are provided with ductile impact resisting cores and meshing surfaces which are hardened and ground to finished shape prior to assembly thereof, with a helix angle of about 45° or more,
(f) each of said right hand helical gear portions being of the same width as and axially spaced from its adjacent left hand helical gear portions to form an annular gap therebetween, each of said adjacent helical gear portions having the angular alignment of their teeth such that their helices intersect within said gap at one side of its central plane,
(g) said idler gears being free to float in an axial direction, whereby transmitted load is distributed equally between adjacent pairs of meshing helical gears irrespective of their rotational errors of assembly, (h) said transmission, as compared to a like transmission having 0° tooth helix angle, generating 1/200 to 1/500 of the sound energy of said like transmission.

References Cited by the Examiner
UNITED STATES PATENTS

| | | | |
|---|---|---|---|
| 1,031,758 | 7/12 | Westinghouse | 74—410 |
| 2,496,857 | 2/50 | Cronstedt et al. | 74—410 |
| 2,938,485 | 5/60 | Riley et al. | 114—20 |
| 2,967,502 | 1/61 | Hammond | 114—20 |
| 2,975,746 | 3/61 | Corbett | 114—20 |
| 2,982,144 | 5/61 | Wallgren | 74—458 X |
| 3,010,416 | 11/61 | Mueller | 114—23 |
| 3,011,365 | 12/61 | Stoeckicht | 74—801 |

DON A. WAITE, *Primary Examiner.*

BROUGHTON G. DURHAM, *Examiner.*